Patented Apr. 30, 1940

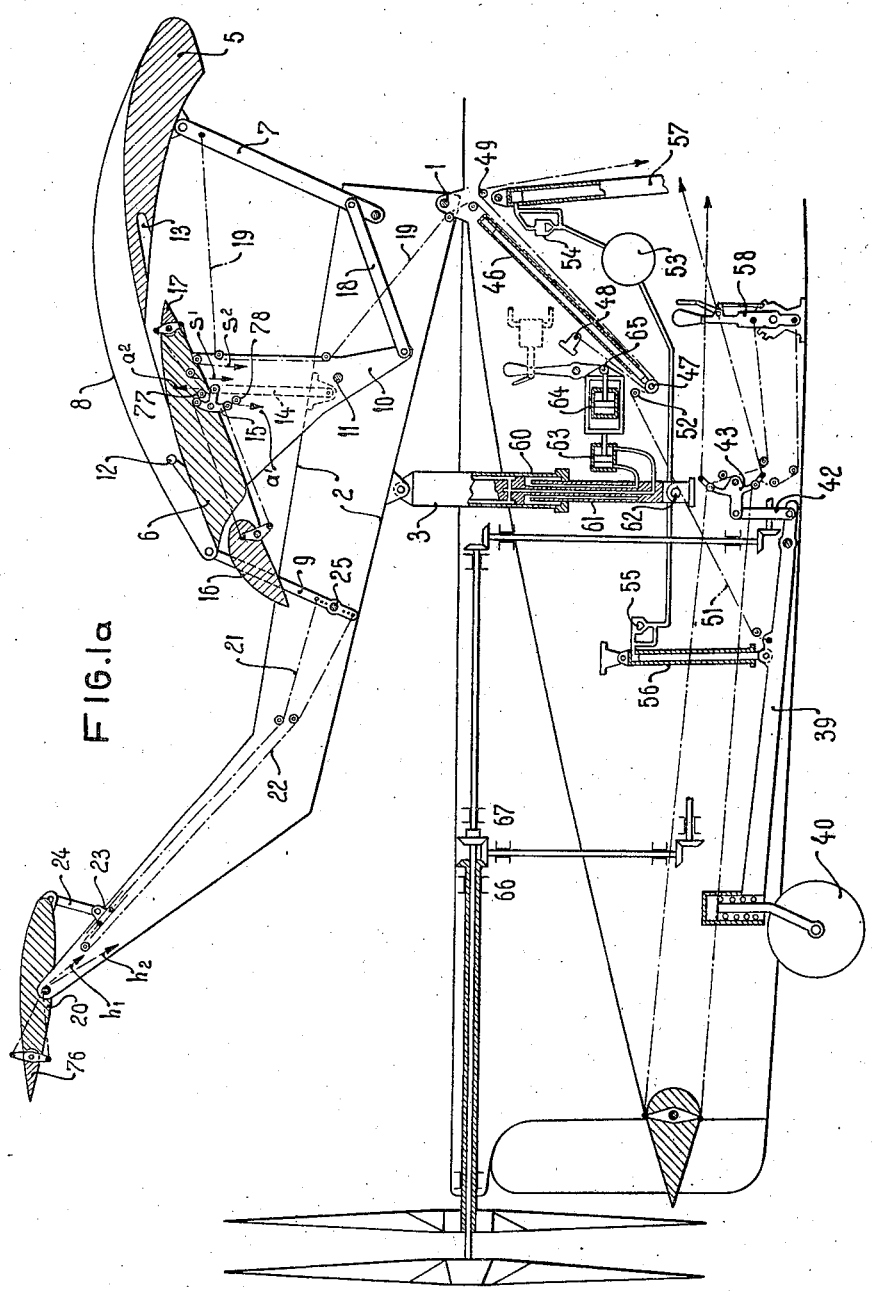

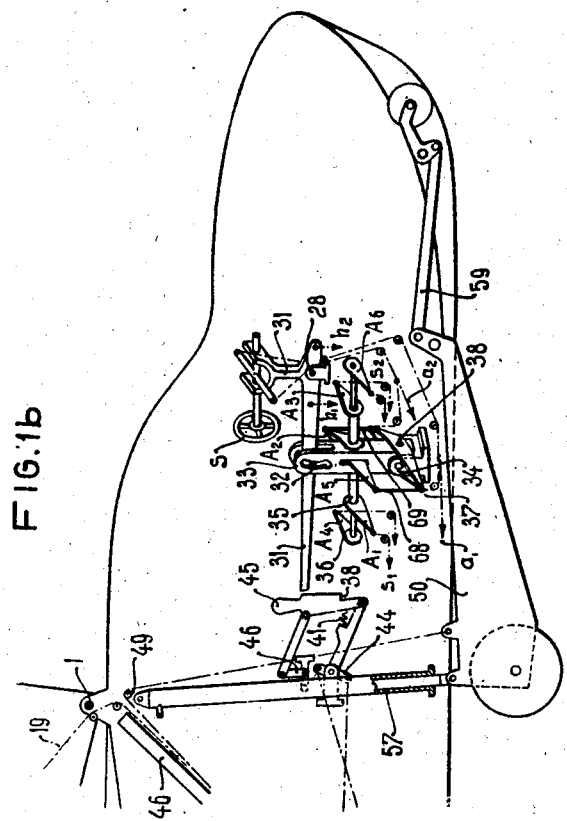

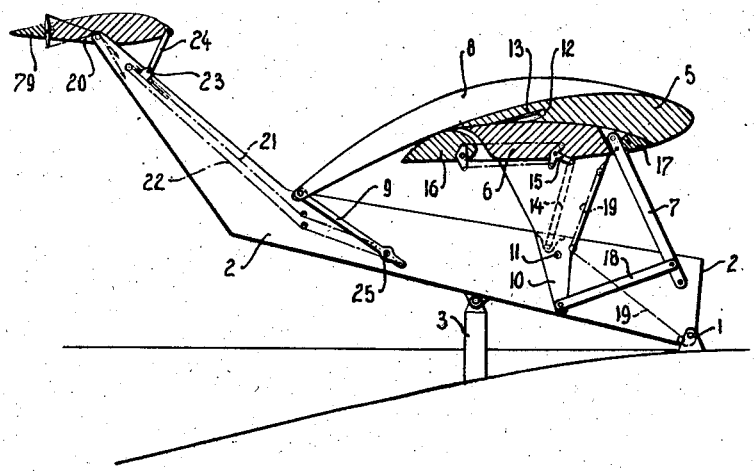
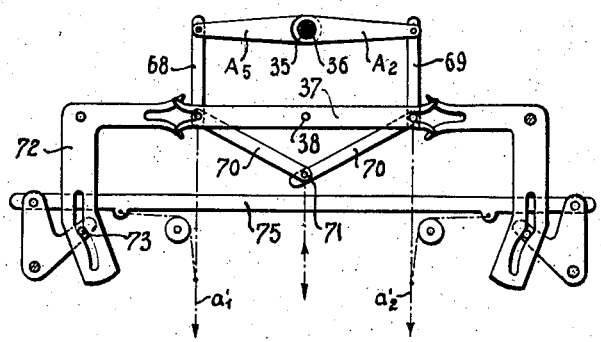

2,198,893

UNITED STATES PATENT OFFICE 2,198,893

AIRCRAFT

Theodorus van Waveren, Hillegom, Netherlands

Application June 26, 1937, Serial No. 150,511
In the Netherlands June 29, 1936

16 Claims. (Cl. 244—42)

This invention relates to aeroplanes. Its principal object is an aeroplane having a relatively great cruising speed and a low landing speed and which, in addition to being easily controlled, has considerable longitudinal stability in the range of comparatively great lifting power and during landing, which features are specially desirable for a sporting machine.

With said and other objects in view, the wing or aerofoil in accordance with my invention is composed of sections adapted to be folded or housed together so as to form a wing of standard section contour, which preferably has a substantially invariable center of pressure. Said sections are arranged to be opened or spread apart to form a slotted wing, in such a manner that each section is displaced relative to the position of the closed wing, the forward section moving forwardly relative to said position and at least one of the sections rotating, during the expansion of the wing, about a transverse axis of the machine. The opened or expanded wing thus forms a slotted wing having a suitable curvature or camber and a lift coefficient exceeding that of the closed wing, the point of application and the direction of the air force of said slotted wing being substantially the same as those of the vertical component of the air force of the closed wing. An advantageous feature of this construction is that the landing wheels mounted rearwardly of the center of gravity are the first to touch the ground and that at such moment a considerable amount of lift is still available, until also the front wheel contacts with the ground to absorb the remaining portion of the inertia.

Slotted wings have already been suggested, in which the slot can be covered and uncovered by the displacement of a small, movable wing element relative to the fixed body portion of the wing.

In other known aeroplanes, the one wing section is adapted to slide relative to the other so as to increase the length or the spread of the wing and thus ensure increased lift. With this construction, the point of application of the air force is shifted through an appreciable distance, so that considerable deflection of the elevator is required for restoring equilibrium. Moreover, the section contour of these known wings is not altered so fundamentally as to vary the lift to an extent to allow the machine to pass from a cruising speed of say 250 km./hour to a soaring or gliding speed of say 50 km./hour.

The cambered section contour of the slotted wing produced by the expansion of a composite wing in accordance with my invention has an exceptionally high lift coefficient. Furthermore, said contour has the advantage that increase or decrease of the angle of incidence results in the center of pressure being shifted to the rear or to the front, respectively. This is very favorable both when diving and stalling, since said feature renders the aerofoil more or less self-stabilizing.

During the opening of the wing, both wing sections should preferably perform rotary movement in such a manner that the leading edge of the forward section and the trailing edge of the rearward section are relatively lowered. The curvature of the wing is thereby increased, and during gliding the center of pressure is not shifted relative to the fuselage.

During flight, the width of the slot between the wing sections can be varied by relative movement of the sections, whereby the lift of the rearward section is favorably affected.

This is a feature of great importance for the control and the longitudinal stability, especially during landing. Moreover, each of the two wing sections is a comparatively big body having sufficient depth as to permit of a self-supporting construction. Owing thereto, said sections can be adjusted, more or less independently, the one of the other, by means of simple and reliable mechanism.

The width of the slot between the wing sections can also be controlled by means of a flap, or flaps, hinged to the leading edge of the rearward wing section, or to the trailing edge of the forward wing section.

The provision of a flap or flaps for controlling the width of the slot between the wing sections is very advantageous not only with a view to shifting the center of pressure of the aerofoil, but also for increasing the drag coefficient if during gliding it is desired to steepen the descent, or if the drag is to be considerably increased for holding off when landing.

In this connection it is to be remarked that, if a machine of ordinary construction is suddenly held off the moment wherein it is already quite close to the ground, for instance, owing to fog or restricted size of the field, its lift will be rapidly increased to an extent as to cause the machine to rise and thereafter to alight again. Closure of the slot between the sections of the expanded wing, however, will increase the wing resistance abnormally as compared with the effect of an increase of the angle of attack, so that, when the nose of the machine is brought up, the tail will contact with the ground, whereupon the fuselage (which, if exposed to side wind, is thus enabled to assume the correct landing direction) will drop until the landing wheels forward of the center of gravity contact with the ground.

As the coefficients of wing resistance retain their increased values also during the decrease of the angle of attack incident to the machine dropping, the latter will come to a standstill after a very small forward run.

The aforesaid flaps for controlling the width of the slot between the sections of the expanded wing, in combination with both the high maximum value of the lift of the open wing and the horizontal position of the fuselage during gliding, allow of the provision of automatic means for holding the machine off. In accordance with the invention, the rear landing wheels may be mounted to the free end of a long strut hinged to the fuselage and extending in rearward direction, said strut being released prior to landing so as to swing downward. As soon as the said wheels touch the ground, the strut is again forced towards the fuselage, during which movement it actuates, through suitable cables, the said flaps and, if desired, also the elevator. Owing thereto, the tail is forcibly pressed towards the ground, this movement being damped by a shock absorber interposed between the strut and the fuselage.

This automatic holding off is favorably affected by the fact that only a very short time lapses between the moment wherein the tail wheels contact with the ground and the moment in which the wing resistance is increased owing to the closure of the wing slot. In ordinary machines the force acting on the elevator and by which the angle of attack is increased with a view to holding off is directed downwardly. In accordance with the invention, the desired effect is brought about by a rearwardly directed force acting on the complete wing, said force being produced by contact of the tail wheels with the ground. This novel feature is very favorable in view of the fact that only very little time is available for said landing maneuver.

Owing to its low landing speed, its automatic holding off, its landing by the tail and the functioning of its wing as an air brake, an aeroplane in accordance with my invention is adapted during landing to withstand considerable horizontal ground resistance of the wheels, without overturning. As a matter of course, the undercarriage should be so constructed as to turn said features to advantage. If the undercarriage of an ordinary aeroplane were made in the form of a rearwardly directed strut provided at its end with landing wheels, it would not prevent overturning of the machine when landing on a field covered with boulders or intersected by ditches, especially not if the field is very small so that the wheel brakes are to be applied. With a machine in accordance with my invention, however, provided with such a wheeled tail strut, no difficulties of this kind will be encountered, especially not since the tail strut also acts as a shock absorber, which not only damps the vertical landing shock, but also horizontal impacts caused by boulders or other obstacles.

Should the machine be provided with a conventional undercarriage, the wheels thereof could be engaged by a rail, a tree-stump or a ditch, in which case the good landing properties of the air craft would be of no avail, but a rearwardly directed, resilient tail strut as used in an aeroplane in accordance with my invention is adapted freely to move over such obstacles and nevertheless to perform its primary function, viz. absorbing the landing shock.

The rearward wing section may advantageously be provided along its trailing edge with a flap (or with separate starboard and port flaps adapted to function as ailerons but also as landing flaps) which, in accordance with my invention, may be under the control of the mechanism for opening the wing in such a manner that, when the wing is being expanded, said flap is automatically lowered so as to increase the lift.

The slot between the forward and the rearward section of the opened wing should be defined by substantially parallel walls, since a deviation of say 10° from parallelism would already very unfavorably affect its operation.

The point of application of the air force is not appreciably shifted if, in accordance with my invention, the forward section of the wing moves forwardly during the opening of the wing. Preferably, the rearward section of the wing is arranged to move to the rear simultaneously with the forward movement of the forward section, whereby a considerable chord and, consequently, a great lift is obtained, without the point of application of the air force being shifted appreciably, it being understood that the rearward wing section should move to the rear through a smaller distance than does the forward wing section to the front.

In accordance with my invention, the mechanism for expanding and folding the wing is preferably so arranged that, when the wing is being opened, the vertical distance from the forward wing section to the fuselage is initially increased. This permits the wing to open automatically under the action of the air force, in which case it will be necessary to lock the wing sections against relative movement during cruising. The arrangement may be so that the wing sections are automatically moved apart when the angle of incidence is positive, and automatically nested when said angle is negative. The tendency of the machine to assume the inverted position is thereby neutralized.

During the take off run, the wing is initially closed under the action of its own gravity, so that the machine is quickly speeded up.

As soon as the speed has attained the value at which the air force balances the weight of the wing, the latter opens automatically, when its lift capacity is sufficient to raise the machine from the ground. Thus, the machine can start from a field of very limited length. During standstill on the ground, the wing is closed, so that the wind has only little hold thereon.

If during gliding the wing should contract owing to the angle of incidence becoming negative, the machine will not be less stable in longitudinal direction than a good commercial aeroplane. The self-stabilizing properties of the wing may even be made to predominate, when the elevator may be so small as to just suffice for gliding and for holding the machine off just before landing, but not for stalling and diving. If the pilot is sufficiently experienced, however, the elevator may be so arranged that, when the machine has risen from the ground with its wing opened, the same can be caused to dive, whereby the wing is automatically closed and its sections locked, and cruising begins. In that case, special mechanism, operated manually or by motor power, for closing the wing during flight can be dispensed with.

Since the self-stabilizing properties of the expanded wing are effective only with a low center of gravity or point of suspension, the aircraft will preferably be constructed as a monoplane of the parasol type. This construction also facilitates the accommodation of the wing expanding mechanism and ensures the air to flow in stream lines as far as possible.

Seeing that the total resistance of the expanded wing will, owing to the increased wing area and the increased resistance coefficients, considerably exceed that of the closed wing, the inertia of the fuselage and the braking power of the wing during expansion will, owing to the low center of gravity, produce a considerable couple which for its neutralization would require an excessively large and strong stabilizing plane to prevent the angle of incidence from being excessively increased (and the wing from being overloaded) during the time required for reducing the cruising speed (obtained with the wing closed) to the lower value corresponding with the increased lifting power of the expanded wing.

The necessity of providing for such an abnormally large tail plane is, however, partly avoided by the hereinbefore explained manner in which, in accordance with my present invention, the wing sections are moved apart, whereby the resultant acting on the expanded wing coincides with the vertical component of the air force acting on the closed wing (owing whereto the fuselage remains horizontal during gliding, abstracting from the air forces acting thereon), so that the angle of incidence, after the expansion of the wing, is appreciably smaller than it would be if the vertical components of the air forces acting on the expanded and on the closed wing, respectively, should coincide.

A machine in accordance with my invention may be provided, in addition to a hydraulic brake in the wing expanding mechanism, with further means for preventing overload and shocks. That is to say, the fuselage may be hinged to the wing with associate parts through an axis over and at a considerable distance from the center of gravity, whereby the length of the lever arm, on which acts the horizontal component (drag) of the air force and which influences the tail plane and the angle of incidence of the wing, is considerably reduced and reaction of the inertia of the fuselage on the wing is suppressed. Further advantages of this construction are:

1. During expansion of the wing, the fuselage will perform a forwardly swinging movement and assume an upwardly inclined position, thereby offering increased resistance and thus assisting in reducing the speed, 2. The automatic holding off is decidedly improved. The drag acting on the wing will more promptly increase the angle of incidence, as the inertia of the fuselage need not be neutralized. The pressure exerted during landing on the wheeled tail strut will be reduced, as the fuselage has freedom of swinging backwards. The angle of incidence and, consequently, the braking action of the wing, remains constant, regardless of the swinging motion of the fuselage. Thus the holding off action is amplified and the forward run shortened.

The reduction of the mass to be displaced makes still another improvement possible. The wheeled tail strut may be arranged so as to raise the elevator during the first part of its stroke, whereby the lift is increased and also the drag increases in accordance with the normal lift to drag ratio.

The lift, which is now effective to the maximum extent to hold off the machine, stops the downward movement of the machine and could even cause the same to rise for a moment. Meanwhile, the tail wheel strut finishes its inward stroke, owing to the tail of the machine descending, and this portion of the movement of the strut is transmitted to the slot flap, so that the slot is closed, the lift reduced and the machine prevented from again disengaging the ground. Moreover, the lift to drag ratio is considerably reduced, that is to say, the drag increased, so that the braking action of the wing is amplified and the machine comes to a standstill.

3. Owing to the reduction of the length of the lever arm on which the wing resistance acts, the center of gravity of the fuselage may be very low, which improves the steadiness of the machine when floating on water and, during landing, assists in preventing the machine from overturning.

4. Shifting of the center of gravity of the fuselage, due, for instance, to displacement of passengers, can only affect the position of the fuselage, but not the angle of incidence of the wing.

5. The said hinged suspension of the fuselage does away with the necessity of controlling the tail plane when passing from gliding to motor flight, either with expanded or with closed wing, which control would otherwise be necessary in view not only to the difference between the drag coefficients of the opened and of the closed wing, respectively, but also and especially of the change in the direction of the resultant of the air forces. Indeed, if the propeller is so mounted that its axis passes through the hinge between wing and fuselage, the propeller force, the air force and the gravitation will under all circumstances pass through one common point.

6. The propeller may be mounted at the rear side of the fuselage in an elevated position, seeing that the fuselage may have a reduced length. Owing thereto, damage to the propeller during automatic holding off is entirely avoided, since the fuselage can approach the ground to the fullest extent until it is engaged by the landing wheels, without the propeller contacting with the ground. Thus, the length of stroke of the shock absorbers may be increased and the inertia can be damped at relatively low hydraulic pressure, which is very important in view of the very short time and the very small space available for the automatic holding off.

The tail plane associated with the wing functions not only to stabilize the angle of incidence, but also to counteract the effect of the displacement of the center of gravity of the wing in its different positions.

The angle of incidence is adjusted by the elevator hinged to the tail plane and, in emergency cases, by means of hydraulic gear interconnecting the wing and the fuselage, which gear normally serves to damp relative movement of fuselage and wing.

The air forces acting on the fuselage may be controlled by means of a small stabilizing plane at the rear end of the fuselage.

During flight with expanded wing, the starboard and port flaps for controlling the width of the slot between the two wing sections are used for ensuring control of direction. If the starboard flap is closed and the port flap open, the resistance of the starboard half of the wing will be increased and its lift reduced relative to that of the port half, thus giving lateral control.

When the wing is closed, lateral control may be obtained by the ailerons and and by a rudder at the rear end of the fuselage, but also by the slot flaps, as it will be understood that outward deflection of one of these flaps will increase the resistance of the corresponding wing section and cause the same to lag behind the other.

In order that my invention may be more fully understood, reference is had to the diagrammatic drawings, in which Fig. 1a shows in section the rear portion of the fuselage together with a wing.

Fig. 1b shows partly in section the front portion of the fuselage.

Fig. 2 is a sectional elevation of the wing in closed position, with associate parts, and Fig. 3 is a detailed view of the mechanism for controlling the wing slot flaps.

As shown in Fig. 1, the fuselage is provided on its top side with a transverse shaft 1. Rotatably mounted on said shaft 1 are a pair of longitudinal beams 2 (one of which only is shown), carrying the tail plane 20 with the elevator 76 and, through suitable connecting mechanism, the composite wing 5, 6. The beams 2 are rigidly interconnected, either by suitable bracing, or through the hydraulic shock absorber 3 to be described hereinafter.

The wing sections 5 and 6 are so formed and hinged to the beams 2, that, when said sections are moved apart in fore-and-aft direction, a slotted wing having a pronounced camber is formed owing to the one section being moved in forward and the other in rearward direction, during which movement both sections also perform rotary motion.

During this expansion of the wing, the forward section moves through a greater distance than does the rearward section, whereas the forward section, at least during the first part of its movement, is raised relative to its position in the folded wing. Owing thereto, the air force tends to spread the wing.

The forward wing section 5 is pivoted to the beams 2 by means of a pair of struts 7 pivoted to said section in points which substantially coincide with the center of pressure of said section in its extreme forward position.

Furthermore, the forward wing section 5 is rigidly secured to a pair of rearwardly extending arms 8, which are likewise pivoted to the beams 2 through a pair of connecting struts 9. The forward wing section 5 is adapted to be held in its extreme forward position by the action of the air force, which causes the struts 9 to abut against the rearward wing section 6.

Rigidly secured to the rearward wing part 6 are a pair of downwardly extending arms 10 pivoted as at 11 to the beams 12. Each strut 7 is connected to the corresponding arm 10 through a rod 18 pivoted to both, said rod serving to coordinate the movements of both wing sections.

The rearward wing section 6 is provided on its top with a plurality of fingers each carrying a roller 12 adapted to engage a corresponding recess 13 of the forward wing section 5 so as to prevent relative movement of both sections when these are housed together.

Hinged to each beam 2 is the lower end of a connecting rod 14, the upper end of which is pivoted to the stem of a double bell crank lever 15 pivoted to wing section 6 and provided at its free ends with deflector sheaves for cables $a_1$—$a_2$ controlling one of a pair of flaps 16 provided at the trailing edge of said wing section. When the wing is being expanded, the double bell crank lever 15 is rotated by the connecting rod 14, whereby the said cables, which are passed over sheaves 77, 78 pivoted to the wing section 6, lower the flap 16 so as to still further increase the bottom camber and, consequently, the lift coefficient of the wing, it being understood, however, that the control just described does not prevent the pair of flaps 16 from being used as ailerons. In addition to this mechanism, other ailerons may be provided. These have not been shown, as it is well known to anyone skilled in the art, how to control such ailerons by means of cables passed over the hinges of other parts.

Hinged to the leading edge of the rearward wing section 6 is another pair of flaps 17 for controlling the width of the slot between the sections of the expanded wing. Upward movement of these flaps reduces the cross-sectional area of the slot, whereas downward movement thereof increases the inrush of air into the slot. When the wing is closed, the flaps 17 can be lowered in unison or individually, and then serve to increase the resistance of the wing. The cables for controlling the flaps 17, the same as the control cables of other movable elements, run to handles or the like provided in the fuselage. For the sake of clearness, only parts of said cables are shown.

A cable 19, connected to the upper end of strut 7, is passed over a sheave rotatably mounted to arm 10 a short distance below the rearward wing section 6, and thence over a second deflector sheave to the fuselage. When this cable is drawn in, the wing sections are moved towards one another and the wing is closed. If, with the wing in its folded position, the cable 19 is allowed to run out, the wing can expand. The drawing in and the paying out of the cable 19 are effected by means of hydraulic gear, which is mounted in the fuselage and which will be described hereinafter.

The rear ends of the beams 2 support the tail plane 20, which is automatically adjusted when the wing is opened. To this end, the strut 9, which is hinged as at 25 to the beam 2, is associated through cables 21, 22 with a traveller 23 adapted for rectilinear sliding movement along beam 2 and connected with the tail plane through a rod 24 pivoted to both. As shown, the cables 21, 22 are secured to the struts 9 in points on either side of pivot 25. This adjustment of the tail plane 20 may be necessary for compensating the effect of displacement of the point of application of the air force owing to relative movement of the wing sections. By changing the connections of the cables 21 and 22 to the strut 9, the tail plane 20 can be adjusted either in positive or in negative sense, whereas the rate of adjustment depends upon the distance to the pivot 25 of the points in which said cables are connected to said strut.

When the steering wheel S for controlling lateral and longitudinal stability is turned, the cables $a_1$—$a_2$ are drawn in or run out, but when moved in fore-and-aft direction, it causes an arm 31 to swing about a fixed axis 28. This swinging movement controls the cables $h_1$—$h_2$ of the elevator 76 in the usual manner.

A lateral pin 32 of arm 31 engages suitable guiding slots provided in a vertical fork 33, the lower end of which is pivoted as at 34, so that it is capable of swinging movement in the vertical plane of arm 31. A horizontal, hollow shaft 35, which is in parallel relation with the longitudinal axis of the aeroplane, is passed through the fork 33 and rotatably supported by a suitable bearing thereof. Shaft 35 carries arms $A^1$, $A^2$ and $A^3$ and accommodates a second shaft 36 carrying arms $A^4$, $A^5$, $A^6$. Owing to the shaft 35 being supported by a bearing secured to the fork 33, its axis will always be at right angles to that of said fork.

Secured to the ends of arms $A^4$ and $A^1$ are the cables $s_1$, which, when said arms are moved upwards, raise the starboard and the port flaps 17, i. e., reduce the cross-sectional area of the slot between the wing sections 5 and 6. Upward movement of arms $A^3$ and $A^6$, which are connected to cables $s_2$, causes both flaps 17 to be lowered.

If the hollow shaft 35 is turned by its arm $A^2$ being moved up or down, only one of the two flaps 17 is controlled, whereas shaft 36 controls the other flap 17 when swinging movement is imparted to arm $A^5$.

Consequently, both flaps 17 can be actuated the one independently of the other, unless arms $A^5$ and $A^2$ are suitably coupled. This coupling is brought about, in a manner to be described hereinafter and during flight with the wing sections 5, 6 spread apart, through connecting rods 68 and 69 and a beam 37, which is rotatably mounted on a spindle 38, the axis of which horizontally intersects axis 34.

The cables $a_1$—$a_2$, which are passed over the pivot 28 and thence to the flaps or ailerons 16, have branches secured to the ends of beam 37, in such a manner that said beam transmits the control movements for the ailerons 16 also to the wing slot flaps 17, as long as the connecting rods 68, 69 engage the ends of beam 37, which is the case during flight with the wing expanded. As soon, however, as the wing is closed, the slot flaps 17 can only be lowered, it being understood that the lowering of one of these flaps then causes the corresponding half of the wing to be braked, whereas with the wing expanded the said flap requires to be raised in order to bring about said braking effect. Consequently, the control of arms $A^5$ and $A^2$ must be reversed and the length of stroke reduced to one half by means of mechanism, which will be described hereinafter and which may not interfere with the control of the ailerons 16. This mechanism is shown in Fig. 3. For the sake of clearness, Fig. 1 does not show said mechanism.

The guiding slots provided in the fork 33 for controlling the movement of pin 32 are in the form of circular arcs struck from the axis 28 and extending through angular distances such as to allow arm 31 to perform the swinging movement required for the normal control of the elevator through the cables $h_1$—$h_2$. Consequently, during said control the fork 33 remains stationary.

If, however, it is desired for the angle of incidence and the gliding angle to be increased beyond the value attainable by the normal maximum deflection of the elevator, for instance, when it is desired for the machine to be held off and stopped, the pilot pulls the steering wheel S still further backwards, whereby the pin 32 enters into an offset portion of the guiding slots in the fork 33 and the latter, together with the shafts 35, 36, swings about its axis 34. This causes both the starboard and the port flaps 17 to be raised, owing to the drawing in of their cables by the upward movement of the ends of arms $A^1$ and $A^4$. This does not interfere with the adjustability of said flaps the one relative to the other, so that these flaps can still be controlled as ailerons coordinated with ailerons 16.

The automatic holding off is brought about by a hook 38, provided with a handle 45 and adapted to engage the end of arm 31 in its uppermost position, when the pilot has released the tail strut 39 carrying the wheel or wheels 40, and thus allowed the same to fully swing down just before landing. The hook 38 is moved into locking position under the action of a spring 41. As soon as the machine alights, the tail strut 39 swings upwards towards the fuselage under the influence of the ground pressure, which swinging movement is transmitted through a connecting rod 42 and a double bell crank lever 43 to a double bell crank lever 44, the stem of which is pivoted to the hook member 38. As a consequence thereof, the hook member 38 and the arm 31 engaged thereby are pulled downwards, thereby controlling the elevator and the flaps 17 for holding off and braking the machine.

By means of the handle 45, the pilot can pull hook member 38 back and thus render it inoperative, when he wishes to retract the landing wheels after the machine has taken off. This backward movement of hook member 38 also controls the handle 46 of the valve of the oil pump, so that it is impossible for the tail strut 39 to actuate the holding off device when it is retracted in the air.

The cable 19, which has for its duty to close the wing, is led over a roller 47 mounted at the lower end of the piston of a hydraulic cylinder 46, whence it runs upwards to a fixed bracket 48. Fig. 1 shows the piston of cylinder 46 in its top position, so that the wing is open. For closing the wing, the pilot simply has to open a valve by which pressure oil is pumped into cylinder 46 on the top side of the piston, until the latter has reached its extreme lower position and uncovers a safety port, if the oil supply should not have been cut off in time. If the pilot wishes to expand the wing, he opens an outlet valve at the top end of the cylinder 46, whereby the oil can slowly escape. The damping action of this hydraulic gear depends upon the cross-sectional area of said outlet. The escaping oil is collected in a container, whence it is pumped into the cylinder 46 when the wing is to be closed again.

Connected to the bracket 48 is a second cable led over a roller mounted coaxially with roller 47 and thence over a deflector sheave 49 to the front wheel strut 50. It will thus be understood that the front wheel is retracted simultaneously with the closure of the wing. Another cable 51, directly secured to the lower end of the piston working in cylinder 46, runs over a deflector sheave 52 to the tail wheel strut 39, and serves for retracting the same.

Downward swinging movement of the tail and front wheel struts 39 and 50 is performed by allowing their cables to run out simultaneously with the expansion of the wing. At the same time, pressure oil is permitted to flow from the low pressure oil reservoir 53 through check valves 54, 55 to hydraulic shock absorbers 56 and 57, each of which comprises a hydraulic cylinder with a piston working therein. The landing shock is damped by the oil in cylinders 56 and 57 slowly escaping through narrow ports at the top ends of said cylinders, these ports being connected through the supply pipes with the reservoir 53. Since the closing of the wing must take place very slowly in order that the speed of the machine may gradually decrease as the wing area is reduced, the resistance offered to the discharge of oil from the shock absorbers 56, 57 will be low. If necessary, this resistance can still be reduced by opening the check valves 54, 55.

It goes without saying that the landing wheels can be arranged as to be entirely retractable into recesses of the fuselage, and that suitable covers may be provided for closing said recesses. For the sake of clearness, Fig. 1 shows said wheels in a position somewhat outside the fuselage.

As stated, outward swinging motion of tail wheel strut 39 causes the double bell crank lever 43 to turn. Deflector sheaves provided on said lever 43 serve to guide the control cables of the tail plane of the fuselage in the same manner in which the control cables of ailerons 16 are led over the sheaves of the double bell crank lever 15, it being understood that said tail plane is raised and thereby the rear end of the fuselage pressed down as soon as the wing is opened and the landing wheels swung out. This keeps the tail low during gliding and holding off. Through the hand lever 58, the tail plane of the fuselage can always be manually controlled in the normal manner.

The front wheel strut 50 has a hinged connection with a rod 59, through which a small front steering wheel is swung out simultaneously with the outward movement of the wheel struts 50 and 39.

Each of the two shock absorbers 3 interposed between the fuselage and the beams 2 consists of a hydraulic cylinder 60 filled with oil and pivoted to the beams 2, and of a piston working therein, said piston being pivoted as at 62 to the fuselage. The oil, which, during movement of the wing relative to the fuselage, escapes at the lower or at the upper end of the cylinder 60 shown on the drawings, flows in separate streams through longitudinal passages in the piston rod and thence through flexible tubes into a cylinder 63, the piston of which is rigidly connected to a second piston of equal cross-sectional area and working in a cylinder 64 of the same size as cylinder 63. Both ends of cylinder 64 are connected with the shock absorber 3 (not shown) at the other side of the machine in just the same manner as described above. Owing to the described association of cylinders 63 and 64, no undue strain can set up in the beams 2.

In case of damage to the tail plane 20 at the rear end of beams 2, or to the elevator 16, the position of the beams 2 relative to the fuselage can be controlled by means of a handle or a servomotor engaging an eye 65 of the combined pistons working in cylinders 63, 64.

The machine shown in Fig. 1 is provided with two motors for driving two coaxial propellers revolving in opposite directions. The correct ratio between the speeds of said propellers is controlled by the mitre wheel 66. When the clutch 67 is opened, the propellers are free to rotate the one independent of the other.

The differential control mechanism for the flaps 17 is shown in Fig. 3. In this figure, the references $a^1_1$ and $a^1_2$ designate the cables branched from cables $a_1$ and $a_2$, respectively. As shown, the beam 37 is bifurcated at both ends to engage lateral pins provided on the lower ends of the connecting rods 68, 69 depending from arms $A_5$ and $A_2$ respectively. Through said pins, the connecting rods 68, 69 are pivoted to the upper ends of levers 70, the lower ends of which are interconnected by a pivot pin 71, so that upward movement of pin 71 causes the lateral pins of rods 68, 69 to disengage the bifurcated ends of beam 37, and to engage the forked ends of the horizontal arms of bell cranks 72, the depending arms of which are each provided with a slot engaging lateral pin 73 on one arm of a bell crank 74. The other arms of both bell cranks 74 are interconnected by a horizontal rod 75, to which are secured cables branched off from cables $a^1_1$—$a^1_2$.

The power portion of the slot provided in each of the bell cranks 72 forms a circular arc struck from the axis of rotation of the corresponding bell crank 74, the upper portion being offset in relation thereto. Owing to this construction, and assuming the connecting rods 68, 69 to have engaged the bifurcated ends of the bell cranks 72, rotation of bell crank 74 in one direction will not affect the position of its bell crank 72, whereas rotation in the opposite direction will cause bell crank 72 to swing about its axis, so that each of the connecting rods 68, 69 will follow the control movements of cables $a^1_1$—$a^1_2$ in one direction only, viz., in a direction opposite that of the corresponding end of the now idly oscillating beam 37.

Vertical movement of pin 71 during the expansion and the closure of the wing is controlled by bell crank lever 43 through the medium of a suitable system of levers and cables.

From the above description it follows:

1. That with an aeroplane in accordance with my invention a relatively high cruising speed and a low landing speed can be attained;

2. That the machine can be very economic, since the elevator has a very small size or may altogether be dispensed with, and a high lift coefficient is attainable, both at cruising speed and at landing speed, owing to the use of a wing of standard monoplane section contour and of a cambered slotted wing, respectively;

3. That the automatic adjustability of the wing in fore-and-aft direction facilitates the control of the machine, so that learning to fly in this machine is very easy and both ascending and descending air currents cause a displacement of the wing relative to the center of gravity in the correct direction, without it being necessary for the operator to effect any adjustment;

4. That landing on the tail is normal with this type of machine, so that landing on very rough surface and with side wind is much less dangerous than with air craft of known types;

5. That the stability is not impaired if the engine is voluntarily or unvoluntarily stopped;

6. That changes in the distribution of the mass of the fuselage cause the resultant of the air forces acting on the wing to automatically shift into a position vertically above the center of gravity;

7. That the expanded wing, provided the same is not locked, automatically assumes it closed or folded position when the angle of incidence becomes negative, or when the machine tends to reverse its position, and that the machine then readily resumes its normal position.

What I claim is:

1. In an aeroplane, a fuselage, an upper front wing section and a lower rear wing section, said sections being relatively movable into close engagement to form a complete wing, said sections when arranged to form a complete wing having a standard streamline section contour, said sections being relatively spreadable to partly overlap one another and be separated by a slot defined by substantially parallel walls, the bottom face of the upper front wing section being concave from the trailing edge forward through at least twice the length of the overlapping parts of said sections when spread apart, means associating the upper front wing section with the fuselage and permitting said section to move from its position in a closed wing along a predetermined path in forward direction relative to the fuselage, and means associating the lower rear wing section with the fuselage and operatively connected with the first said means to move, during said forward movement of the upper front wing section, the lower rear wing section from its position in the closed wing along a predetermined path in rearward direction while lowering its trailing edge relative to its leading edge and causing said lower rear wing section to disengage the upper front wing section.

2. In an aeroplane, a fuselage, an upper front wing section and a lower rear wing section, said sections being relatively movable into close engagement to form a complete wing, said sections when arranged to form a complete wing having a standard streamline section contour, said sections being relatively spreadable to partly overlap one another and be separated by a slot defined by substantially parallel walls, the bottom face of the upper front wing section being concave from the trailing edge forward through at least twice the length of the overlapping parts of said sections when spread apart, means associating the upper front wing section with the fuselage and permitting said section to move from its position in the closed wing along a predetermined path in forward and upward direction relative to the fuselage, and means associating the lower rear wing section with the fuselage and operatively connected with the first said means to move, during said forward movement of the upper front wing section, the lower rear wing section from its position in the closed wing along a predetermined path in rearward direction while lowering its trailing edge relative to its leading edge and causing said lower rear wing section to disengage the upper front wing section.

3. In an aeroplane, a fuselage, an upper front wing section and a lower rear wing section, said sections being relatively movable into close engagement to form a complete wing, said sections when arranged to form a complete wing having a standard streamline section contour, said sections being relatively spreadable to partly overlap one another and be separated by a slot defined by substantially parallel walls of said sections, the bottom face of the upper front wing section being concave from the trailing edge forward through at least twice the length of the overlapping parts of said sections when spread apart, means associating the upper front wing section with the fuselage and permitting said section to move from its position in the closed wing along a predetermined path in forward direction relative to the fuselage while raising its trailing edge relative to its leading edge, and means associating the lower rear wing section with the fuselage and operatively connected with the first said means to move, during said forward movement of the upper front wing section, the lower rear wing section from its position in the closed wing along a predetermined path in rearward direction so as to cause the same to disengage the upper front wing section.

4. In an aeroplane, a fuselage, an upper front wing section and a lower rear wing section, said sections being relatively movable into close engagement to form a complete wing, said sections when arranged to form a complete wing having a standard streamline section contour, said sections being relatively spreadable to partly overlap one another and be separated by a slot defined by substantially parallel walls of said sections, the bottom face of the upper front wing section being concave from the trailing edge forward through at least twice the length of the overlapping parts of said sections when spread apart, means associating the upper front wing section with the fuselage and permitting said section to move from its position in the closed wing along a predetermined path in forward and upward direction relative to the fuselage while raising its trailing edge relative to its leading edge, and means associating the lower rear wing section with the fuselage and operatively connected with the first said means to move, during said forward movement of the upper front wing section, the lower rear wing section from its position in the closed wing along a predetermined path in rearward direction so as to cause the same to disengage the upper front wing section.

5. In an aeroplane in accordance with claim 1, a flap hinged to the trailing edge of the lower rear wing section about an axis extending transversely of the machine, and means adapted to lower said flap relative to said section and operatively coupled with the means for moving the lower rear wing section in rearward direction from its position in the closed wing.

6. In an aeroplane in accordance with claim 2, a flap hinged to the trailing edge of the lower rear wing section about an axis extending transversely of the machine, and means adapted to lower said flap relative to said section and operatively coupled with the means for moving the lower rear wing section in rearward direction from its position in the closed wing.

7. In an aeroplane in accordance with claim 3, a flap hinged to the trailing edge of the lower rear wing section about an axis extending transversely of the machine, and means adapted to lower said flap relative to said section and operatively coupled with the means for moving the lower rear wing section in rearward direction from its position in the closed wing.

8. In an aeroplane in accordance with claim 4, a flap hinged to the trailing edge of the lower rear wing section about an axis extending transversely of the machine, and means adapted to lower said flap relative to said section and operatively coupled with the means for moving the lower rear wing section in rearward direction from its position in the closed wing.

9. In an aeroplane in accordance with claim 1, a flap hinged to one of said wing sections and adapted, when the wing sections disengage one another for movement to close the slot then formed between said sections, means for operating said flap, a rearwardly extending feeler connected to the fuselage and arranged for swinging movement in a vertical plane relative to the fuselage, a landing member mounted to the free end of said feeler rearward of the center of gravity of the aeroplane, and means adapted to couple said feeler with said slot closing flap operating means in such a manner that upward swinging motion of said feeler tends to close the slot.

10. In an aeroplane in accordance with claim 2, a flap hinged to one of said wing sections and adapted, when the wing sections disengage one another for movement to close the slot then formed between said sections, means for operating said flap, a rearwardly extending feeler connected to the fuselage and arranged for swinging movement in a vertical plane relative to the fuselage, a landing member mounted to the free end of said feeler rearward of the center of gravity of the aeroplane, and means adapted to couple said feeler with said slot closing flap operating means in such a manner that upward swinging motion of said feeler tends to close the slot.

11. In an aeroplane in accordance with claim 3, a flap hinged to one of said wing sections and adapted, when the wing sections disengage one another for movement to close the slot then formed between said sections, means for operating said flap, a rearwardly extending feeler connected to the fuselage and arranged for swinging movement in a vertical plane relative to the fuselage, a landing member mounted to the free end of said feeler rearward of the center of gravity of the aeroplane, and means adapted to couple said feeler with said slot closing flap operating means in such a manner that upward swinging motion of said feeler tends to close the slot.

12. In an aeroplane in accordance with claim 4, a flap hinged to one of said wing sections and adapted, when the wing sections disengage one another for movement to close the slot then formed between said sections, means for operating said flap, a rearward extending feeler connected to the fuselage and arranged for swinging movement in a vertical plane relative to the fuselage, a landing member mounted to the free end of said feeler rearward of the center of gravity of the aeroplane, and means adapted to couple said feeler with said slot closing flap operating means in such a manner that upward swinging motion of said feeler tends to close the slot.

13. In an aeroplane in accordance with claim 1, an elevator, means for operating said elevator, a rearwardly extending feeler connected to the fuselage and arranged for swinging movement in a vertical plane relative to the fuselage, a landing member mounted to the free end of said feeler rearward of the center of gravity of the aeroplane, and means adapted to couple said feeler with said elevator operating means in such a manner that upward swinging movement of said feeler tends to close the slot.

14. In an aeroplane in accordance with claim 2, an elevator, means for operating said elevator, a rearwardly extending feeler connected to the fuselage and arranged for swinging movement in a vertical plane relative to the fuselage, a landing member mounted to the free end of said feeler rearward of the center of gravity of the aeroplane, and means adapted to couple said feeler with said elevator operating means in such a manner that upward swinging movement of said feeler tends to close the slot.

15. In an aeroplane in accordance with claim 3, an elevator, means for operating said elevator, a rearwardly extending feeler connected to the fuselage and arranged for swinging movement in a vertical plane relative to the fuselage, a landing member mounted to the free end of said feeler rearward of the center of gravity of the aeroplane, and means adapted to couple said feeler with said elevator operating means in such a manner that upward swinging movement of said feeler tends to close the slot.

16. In an aeroplane in accordance with claim 4, an elevator, means for operating said elevator, a rearwardly extending feeler connected to the fuselage and arranged for swinging movement in a vertical plane relative to the fuselage, a landing member mounted to the free end of said feeler rearward of the center of gravity of the aeroplane, and means adapted to couple said feeler with said elevator operating means in such a manner that upward swinging movement of said feeler tends to close the slot.

T. van WAVEREN.